United States Patent [19]
Dietrich et al.

[11] 3,862,973
[45] Jan. 28, 1975

[54] PROCESS FOR THE PREPARATION OF POLYISOCYANATES CONTAINING BIURET GROUPS

[75] Inventors: Werner Dietrich, Cologne; Kuno Wagner, Leverkusen; Manfred Roegler, Bad Godesberg; Helmut Kleimann; Karl Hartwig Richert, both of Leverkusen, all of Germany

[73] Assignee: Bayer Aktiengesellschaft, Leverkusen, Germany

[22] Filed: Nov. 6, 1972

[21] Appl. No.: 304,168

Related U.S. Application Data

[63] Continuation-in-part of Ser. No. 121,542, March 5, 1971, abandoned.

[30] Foreign Application Priority Data
Mar. 7, 1970  Germany............................ 2010887

[52] U.S. Cl.................260/453 AB, 260/2.5 AT, 260/77.5 AT, 260/247.2 A, 260/268 C, 260/293.77, 260/326.4

[51] Int. Cl......................................... C07c 119/04
[58] Field of Search............................. 260/453 AB

[56] References Cited
UNITED STATES PATENTS
| | | | |
|---|---|---|---|
| 2,683,727 | 7/1954 | Martin et al. | 260/453 |
| 3,392,183 | 7/1968 | Windemuth et al. | 260/453 |
| 3,644,490 | 2/1972 | Schmelzer et al. | 260/453 X |

*Primary Examiner*—Lewis Gotts
*Assistant Examiner*—Dolph H. Torrence
*Attorney, Agent, or Firm*—Gene Harsh

[57] ABSTRACT

Biuret-containing polyisocyanates are prepared by reacting organic polyisocyanates with secondary amines at temperatures of from about 80° to about 200°C. The polyisocyanates which contain biuret groups are useful as isocyanate precursors in the preparation of polyurethane plastics by the isocyanate-polyaddition process.

8 Claims, No Drawings

PROCESS FOR THE PREPARATION OF POLYISOCYANATES CONTAINING BIURET GROUPS

This application is a continuation-in-part of copending U.S. Patent application Ser. No. 121,542 filed on Mar. 5, 1971, now abandoned.

This invention relates to polyisocyanates containing biuret groups, a process for their preparation and to their use as isocyanate precursors in the preparation of polyurethane plastics.

It is known that polyisocyanates having biuret structures can be obtained by the action of water on polyisocyanates. However, the disadvantage of this process is that of the formation of substantial quantities of gaseous carbon dioxide.

It is also known that polyisocyanates having biuret structures can be obtained by the reaction of primary monoamines with diisocyanates, the monoisocyanate corresponding to the monoamine being split-off in the process. This process has the disadvantage in that formation of the monoisocyanate, which is usually highly toxic, cannot be entirely eliminated.

According to British Pat. No. 1,078,390, biurets are formed directly from primary diamines and diisocyanates by carrying out the reaction in solvents whose boiling points are below the boiling point of the diisocyanate used. The disadvantage of this process is that the solvents must be removed by distillation after the reaction. Direct reaction of the diamines with diisocyanates in the absence of solvents is not possible, because of the immediate formation of polyureas, which are insoluble in the isocyanate and which prevent further action on the isocyanate.

It is therefore an object of this invention to provide a process for preparing biuret-containing polyisocyanates devoid of the foregoing disadvantages. It is another object of this invention to provide a process for preparing biuret-containing polyisocyanates which are suitable for use as isocyanate precursors in the production of polyurethane plastics. It is a further object of this invention to provide polyurethane foam plastics prepared using biuret-containing polyisocyanates.

The foregoing objects and others which will become apparent from the following description are accomplished in accordance with the invention, generally speaking, by reacting secondary amines with polyisocyanates. More specifically, this invention relates to a process for preparing liquid polyisocyanates which contain biuret groups by reacting polyisocyanates, preferably diisocyanates, with secondary amines at temperatures of from about 80° to about 200° C., such that the molar NCO:NH ratio is maintained in the range of from about 4:1 to about 100:1.

A special advantage of this process is that the NCO functionality of the biuret polyisocyanate obtained may be determined in advance by the choice of the amine component. Thus, for example, tetraisocyanates having the general formula

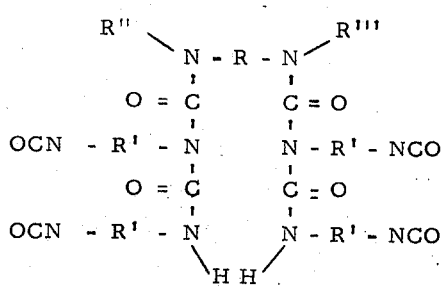

may be obtained from disecondary diamines and diisocyanates. In the above formula R represents a $C_2$–$C_8$ alkylene radical, an arylene radical or a polyarylene radical which contains lower alkylene groups or hetero atoms as bridging members R' represents the divalent hydrocarbon radical corresponding to the diisocyanate R'' and R''' may be the same or different and represent $C_1$–$C_4$ alkylene radicals which may form a heterocyclic ring together with an —N—R—N group, or they may represent an aryl or aralkyl group.

Difunctional isocyanates having the formula

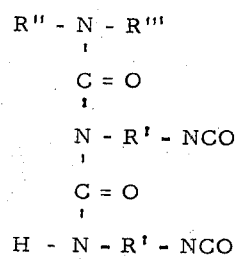

in which
R', R'' and R''' have the meanings indicated above and
R'' and R''' may form a heterocyclic ring together with —N—, may be obtained from secondary monoamines and diisocyanates.

By reacting diisocyanates with a mixture of disecondary diamines and secondary monoamines or a mixture of secondary monoamines and water, the NCO functionality may be adjusted to intermediate values during the process of preparation.

When preparing the biuret-containing polyisocyanates by the process according to the invention, the amine starting materials are generally used in proportions corresponding to a molar NCO/NH ratio of from about 4:1 to about 100:1, preferably from about 6:1 to about 40:1. As a rule, the isocyanate is first introduced into the reaction vessel and the amine is added at a temperature of from about 80° to about 200° C., preferably from about 130° to about 170°C., at such a rate that the temperature of the preheated isocyanate rises by about 20° C. The amine immediately goes into a solution and biuret formation is achieved quantitatively within a short time via intermediate stages which are not isolated. Solid amines may be added in the form of a fine powder, whereas gaseous amines may be passed into the liquid as a stream. Since the process is so easy to handle, preparation of the biurets may also be carried out continuously.

In a continuous process, the amine and the isocyanates are supplied from separate containers and intimately mixed before being introduced into heated reaction tubes. After a short residence time in the reaction tube, the mixture of isocyanate and biuret leaves the tube. Since the heat of reaction can easily be controlled, the process may also be carried out adiabatically.

In the process according to the invention, the polyisocyanates containing biuret groups are generally obtained in the form of solutions in the biuret-free polyisocyanate which is used as a starting material.

Secondary monoamines which may be used in the process according to the invention are e.g. those of the general formula

wherein $R_1$ and $R_2$ are the same or different and stand for radicals selected from the group consisting of $C_1$–$C_{18}$-alkyl, $C_6$–$C_{14}$-aryl and $C_7$–$C_{14}$-aralkyl or wherein $R_1$ and $R_2$ together with the nitrogen atom are part of a heterocyclic ring. Some specific examples are e.g. N-methylaniline, N-ethylaniline, N-octadecylaniline, diphenylamine, dibenzylamine, N-methylnaphthylamine, dimethylamine, diethylamine, dipropylamine, dibutylamine, N-octyl-dodecylamine, pyrrolidine, piperidine, morpholine, and the like.

Bis-secondary diamines which may be used in the process according to the invention are e.g. those of the general formula

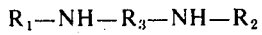

wherein $R_1$ and $R_2$ are the same or different and stand for radicals selected from the group consisting of $C_1$–$C_{18}$-alkyl, $C_6$–$C_{14}$-aryl and $C_7$–$C_{14}$-aralkyl and wherein $R_3$ stands for a radical selected from the group consisting of $C_2$–$C_{12}$ alkylene and $C_6$–$C_{20}$ arylene which arylene radical may contain bridge members such as oxygen, sulphur or an obtionally $C_6$–$C_{10}$-aryl- or $C_1$–$C_4$-alkyl substituted methylene group, or wherein $R_1$ and $R_2$ together with —NH—$R_3$—NH— may form a heterocyclic ring. Some specific examples are e.g. N,N'-diethyl-4,4'-diamino-diphenylmethane, N,N'-dioctyl-4,4'-diamino-triphenylmethane, N,N'-diethyl-2,4-tolylenediamine, N,N'-diethyl-2,6-tolylene diamine, N,N'-dimethyl-1,4-phenylenediamine, N,N'-dimethyl-4,4'-diamino-diphenylether, N,N'-diethylated aliphatic diamines such as, for example, N,N'-diisopropylethylene diamine, N,N'-di-n-butylhexamethylene diamine, piperazine and the like.

It is essential that the secondary amines which are used in the process of the invention do not contain tertiary amino groups such as e.g. N-methylpiperazine. U.S. Pat. No. 3,644,490 describes the reaction between polyisocyanates and secondary amines which contain tertiary amino groups which reaction leads to organic isocyanates containing tertiary amino groups. According to the teaching of U.S. Pat. No. 3,644,490 the reaction between e.g. N-methylpiperazine and hexamethylene diisocyanate leads to an isocyanate which contains tertiary amino groups but no biuret groups. In order to prevent a deterioration of these amino isocyanates caused by the catalytic influence of the tertiary amino group on the isocyanate groups of the diisocyanate starting material which according to U.S. Pat. No. 3,644,490 is generally used in excess care must be taken to remove this excess by thin layer destillation subsequent to the preparation of the modified isocyanate. Thus liquid polyisocyanate compositions containing biuret groups especially mixtures of polyisocyanates containing biuret groups with polyisocyanates which do not contain biuret groups cannot be prepared according to the teaching of U.S. Pat. No. 3,644,490.

Polyisocyanates suitable for use in the process according to the invention are e.g. di-, tri-, and tetra-isocyanates including those of the general formula

in which $n$ stands for an integer of 2–4 and Q stands for a hydrocarbon radical selected from the group consisting of $C_2$–$C_{12}$ aliphatic, $C_4$–$C_{15}$ cycloaliphatic, $C_6$–$C_{20}$ aromatic, $C_8$–$C_{20}$-alkylaromatic, $C_7$–$C_{20}$ araliphatic hydrocarbon radicals which araliphatic hydrocarbon radicals may also carry $C_1$–$C_4$ alkoxy substituents. Specific examples of suitable polyisocyanates for the process according to the invention are tetramethylene diisocyanate, hexamethylene diisocyanate, m-xylylene diisocyanate, p-xylylene diisocyanate, 4,4'-dimethyl-1,3-xylylene diisocyanate, cyclohexylene-1,4-diisocyanate, dicyclohexyl-methane-4,4'-diisocyanate, 1-isocyanato-3,3,5-trimethyl-5-isocyanatomethyl-cyclohexane, m-phenylene diisocyanate, p-phenylene diisocyanate, tolylene-2,4-and -2,6-diisocyanate, 1-benzylphenylene-2,6-diisocyanate, 2,6-diethylphenylene-1,4-diisocyanate, diphenylmethane-4,4'-diisocyanate, 3,3'-dimethoxy-diphenylmethane-4,4'-diisocyanate and naphthylene-1,5-diisocyanate and the like. Trifunctional and higher functional polyisocyanates may also be used such as, for example, 2,4,6-triisocyanatotoluene or polymethylene-polyphenyl-polyisocyanates obtained by phosgenation of the aniline-formaldehyde condensation product. Isocyanates which contain carbodiimide, uretonimine or isocyanurate groups may also be used. Mixtures of the above mentioned isocyanates are also suitable. In addition, reaction products of polyhydric alcohols with polyvalent isocyanates may be used, and polyisocyanates of the type mentioned in, for example, German Pat. Nos. 1,022,789 and 1,027,394 are also suitable.

Preferred polyisocyanates used in the process of the invention are 2,4-tolylene diisocyanate, 2,6-tolylene diisocyanate and isomeric mixtures thereof, hexamethylene diisocyanate, 1-isocyanato-3,3,5-trimethyl-5-isocyanatomethyl-cyclohexane, and 4,4'-diphenylmethane diisocyanate.

The polyisocyanates containing biuret groups prepared by the process of the invention and their solutions in polyisocyanates which are free from biuret groups are valuable starting materials for the production of polyurethane foam resins by the well-known isocyanate polyaddition process.

The present invention, therefore, also relates to the use of the biuret-containing polyisocyanates prepared by the hereinabove described process as isocyanate components for the production of polyurethane foam resins by the isocyanate polyaddition process.

The biuret-containing polyisocyanates are preferably used for the production of hard, semi-hard and soft polyurethane foams, and in particular they are advantageously used in the process of foaming in the mold.

The last mentioned process is characterized in that the reaction of polyols, polyisocyanates and additives takes place in closed molds the internal capacity of which is from about 0.1 to about 0.9 of the volume which the foamed product would occupy if expanded in an open mold, the temperature of the internal surface of the mold being at least about 20° C. lower than the maximum temperature occurring inside the reaction mass during the reaction.

This process is based on the fact that the distribution of density over the cross-section of foam products produced by foaming the mixtures described in closed molds with restricted space for expansion, is a function of the temperature gradient which is established between the surface of the molding and its core during the course of the reaction. This temperature gradient is obtained from the maximum temperature inside the mass which is being foamed in the mold and the temperature of the internal surface of the mold.

This maintenance of a temperature gradient between the surface and the core of the foamed material, which is a characteristic feature of the process, results in the finished foam product having massive, dense surfaces, with the density decreasing from the surface to the center, this decrease in density being greater, the greater the temperature difference between the surface and the core. Certain properties, such as, for example, the resistance to heat distortion, the rigidity and resistance to bending, are thus considerably improved as compared with those properties in similar foams but which have a uniform density.

The ratio of the volume available to the foaming material for expansion in the closed mold to that which would be occupied by the foam if expanded in an open mold should be at least about 9:10 and preferably about 8:10 to about 1:10 (compression factor $$\left(\frac{V_o}{V}\right)$$

at least about 1.1 and preferably about 1.25 to about 10).

Both for foaming in the mold and for producing freely expanded polyurethane foams, any compounds known in the art of polyurethane chemistry which contain hydrogen atoms that are reactive with isocyanate groups, are suitable for use as reactants for the polyisocyanates which contain biuret groups. Any of the activators, emulsifiers, blowing agents, flame retarding substances and the like, commonly used in polyurethane chemistry may be used as additives.

Any compounds which contain hydroxyl and/or carboxyl groups may be used as reactants for the polyisocyanates or polyisocyanate solutions prepared according to the invention. Suitable polyhydroxyl compounds are especially the low molecular weight polyhydric alcohols and higher molecular weight polyesters, polyethers, polythioethers, polyacetals, polycarbonates and polyetheramides which contain several hydroxyl groups, of the type known per se for the production of cellular polyurethanes.

Suitable hydroxypolyesters include for example, reaction products of polyhydric alcohols with polybasic acids, a wide variety of which are known in the art. Instead of free carboxylic acids, however, the corresponding polycarboxylic acid anhydrides, polycarboxylic acid esters or mixtures of these compounds may be used for the preparation of the hydroxy polyesters. The polycarboxylic acids may be aliphatic, cycloaliphatic, aromatic and heterocyclic compounds, and these may be substituted and/or unsaturated. Following are some examples of suitable polycarboxylic acids: succinic acid, adipic acid, sebacic acid, phthalic acid, isophthalic acid, phthalic acid anhydride, maleic acid, maleic acid anhydride, monomeric, dimeric and trimeric fatty acids, dimethyl terephthalates and the like. Suitable polyol components include, for example, ethyleneglycol, propyleneglycol-(1,3), butyleneglycol-(1,4), butyleneglycol-(2,3), glycerol, trimethylolethane, pentaerythritol, mannitol and sorbitol, methyl glycoside, polyethylene glycols, polypropylene glycols, polybutylene glycols and the like. Polyesters which contain terminal carboxyl groups are also suitable for the reaction with the polyisocyanates of the invention.

Suitable hydroxy polyethers are those of known type, and they may be prepared, for example, by polymerizing epoxides such as ethylene oxide, propylene oxide, butylene oxide, styrene oxide, epichlorohydrin and the like, optionally using starting components containing reactive hydrogen atoms, such as, for example, alcohols or amines. Some suitable compounds of the latter types are, for example, glycerol, trimethylol propane, ethylene glycol, ammonia, ethanolamine, ethylene diamine and the like. Sucrose polyethers may also be used.

Examples of polyhydroxyl compounds suitable for reacting with the polyisocyanates which contain biuret groups are described, for example, in Saunders and Frisch "Polyurethanes, Chemistry and Technology", Volumes I and II, Interscience Publishers 1962 and 1964 (pages 32 et seq. of Volume I and page 5 and pages 198 et seq. of Volume II) and in Kunststoff-Handbuch, Volume VII. Vieweg-Hochtlen, Publishers, Carl-Hanser-Verlag, Munich 1966, at pages 45 to 71.

Epoxy resins, hydrogenation products of copolymers of ethylene, olefin and carbon oxides, and phenol formaldehyde resins or urea formaldehyde resins reacted with alkylene oxides are also suitable. A certain proportion of low molecular weight polyhydroxyl compounds of the type already mentioned above or of water, aldimines and ketimines may also be included in the foam formulation.

Foam production itself is carried out by known processes at room temperature or at elevated temperatures, simply by mixing the polyisocyanate combinations with the compounds which contain hydroxyl and/or carboxyl groups, optionally adding water, catalysts, emulsifiers or other auxiliary substances such as, for example, flame retarding substances and blowing agents. Mechanical devices are advantageously used for this purpose, and are described, for example, in French Pat. No. 1,074,713.

Numerous suitable flame retarding substances are known in the art which generally contain phosphorus or halogens. Compounds of antimony, bismuth or boron may also be used. A summary of known and suitable flame retarding agents is given in the chapter "Flammhemmende Substanzen", pages 110–111 of Kunststoff-Handbuch, Volume VII, Polyurethane, by Vieweg-Hochtlen, Publishers Carl-Hanser-Verlag, Munich 1966. The flame retarding substances are generally added in quantities of from about 1 to about 20% by weight, preferably from about 1 to about 15% by weight, based on the quantity of polyisocyanate combinations used.

Suitable blowing agents include, for example, alkanes, haloalkanes or low boiling solvents in general, such as, methylene chloride, monofluorotrichloromethane, difluorodichloromethane, acetone, methyl formamide and the like. Compounds which liberate gases at elevated temperatures, such as, for example, azo compounds, diurethanes or bis-semi acetals obtained from two mols of formaldehyde and one mol of ethylene glycol may also be used as blowing agents.

Suitable activators include, for example, tertiary amines such as triethylamine, dimethylbenzylamine, tetramethylethylene diamine, N-alkylmorpholines, endoethylenepiperazine, urotropine, hexahydrotriazines such as trimethylhexahydrotriazine, 2,4,6- dimethylaminomethylphenol and the like, or organic metal salts such as stannous acylates, for example, stannous salts of 2-ethylcaproic acid and the like, dialkyl stannic acylates such as, for example, dibutyltin dilaurate and the like, or acetyl acetonates of heavy metals, such as, for example, iron.

Some suitable emulsifiers include, for example, hydroxyethylated phenols, higher sulphonic acids, sulphonated castor oil, hydroxyethylated castor oil, sulphonated ricinoleic acid, ammonium salts of oleic acid and the like. Some suitable foam stabilizers include, for example, those based on polysiloxane-polyalkylene glycol copolymers or basic silicone oils and the like. Other suitable emulsifiers, catalysts and additives are mentioned, for example, in "Polyurethanes, Chemistry and Technology", Volumes I and II, Saunders-Frisch, Interscience Publishers, 1962 and 1964.

The quantities of polyisocyanate solutions containing biuret polyisocyanates used should generally be at least equivalent to the sum of the reactive hydrogen atoms present, but if desired they may be used in excess or in subequivalent amounts. When producing foams using water as blowing agent, the polyisocyanates will be used in an excess corresponding to the water content. Excess amounts of isocyanates may also be incorporated into the foam as isocyanurate groups, uretdione groups and/or carbodiimide groups in the course of the foaming process by the addition of trivalent or pentavalent phosphorus compounds such as, for example, phospholidines, phospholine oxide, tertiary esters, amides or ester amides of phosphorous or phosphoric acid and the like.

The foam resins produced from polyisocyanates which contain biuret groups are widely used, for example, in the building industry as building panels, sandwich elements, ceiling panels, parapet panels and the like; as heat insulation in refrigerators, refrigerating store rooms, refrigerator cars, cooling containers and the like; in road and railway building; for the technical insulation of pipes; for the insulation of fuel depots; in ship building; as air filters and filters for hydrocarbons in internal combustion engines; as shock absorbing packaging material or as cushioning material.

The invention is further illustrated but it is not intended that it be limited by the following examples in which all parts and percentages are by weight unless otherwise indicated.

EXAMPLE 1 a. About 2061 parts of N-methylaniline are reacted with about 30,000 parts of a mixture of 65% of 2,4- and 35% of 2,6-tolylene diisocyanate at about 130° C., the amines being added within such a length of time that the temperature does not rise above about 160° C. (from about 1 to about 2 hours). The reaction mixture is thereafter heated for about 1 further hour at about 150° C. An isocyanate mixture having an NCO content of about 40.2% is obtained.

b. About 100 parts of an addition product of about 90% propylene oxide and about 10% ethylene oxide with trimethylol propane, average molecular weight about 3000, about 3 parts water, about 1 part of a commercial polyetherpolysiloxane (L 540 produced by Union Carbide Corp.) and about 0.4 parts of stannous octoate are vigorously mixed with about 481 parts of the product obtained according to Example 1(a). A soft polyurethane foam having a unit weight of about 36 kg/m$^3$, a tensile strength of about 1.0 kg/wt/cm$^2$, elongation at break of about 280% and compression resistance at about 40% compression of about 34 p/cm$^2$ is obtained.

EXAMPLE 2 a. About 2061 parts of N-methylaniline are reacted with about 30,000 parts of a mixture of 80% 2,4- and 20% 2,6-tolylene diisocyanate as described in Example 1(a). An isocyanate mixture having an NCO content of about 29.9% and a viscosity of about 7.1 cp at 25° C. is obtained.

b. About 100 parts of an addition product of about 90% propylene oxide and about 10% ethylene oxide with trimethylolpropane, average molecular weight about 3,000, about 3 parts water, 2 parts of a commercial polyether polysiloxane (L540 produced by Union Carbide Corp.) about 0.7 part of a tertiary amine and about 0.1 part of stannous octoate are vigorously mixed with about 40.1 parts of the product obtained according to Example 2(a). A soft polyurethane foam having a unit weight of about 34 kg/m$^3$, tensile strength of about 0.9 kg/wt/m$^2$, elongation at break of about 290% and compression strength at 40% compression of about 16 p/cm$^2$ is obtained.

EXAMPLE 3 a. About 2770 parts of diphenylamine are reacted with about 30,000 parts of a mixture of 65% 2,4- and 35% 2,6-tolylene diisocyanate as described in Example 1(a). An isocyanate mixture having an NCO content of about 40.0% at 25°C. is obtained.

b. About 100 parts of an addition product of about 90% propylene oxide and about 10% ethylene oxide with trimethylol propane, average molecular weight about 3000, about 3 parts water, about 1 part of a commercial polyether polysiloxane (L 540 produced by Union Carbide Corp.), about 0.5 parts of a tertiary amine and about 0.3 parts of stannous octoate are vigorously mixed with about 48.2 parts of the product obtained according to Example 3(a). A soft polyurethane foam having a unit weight of about 35 kg/m$^3$ and a tensile strength of about 1.1 kg/wt/cm$^2$, an elongation at break of about 205% and a compression strength at 40% compression of about 32 p/cm$^2$ is obtained.

EXAMPLE 4 a. About 165 parts of dibutylamine are reacted with about 2000 parts of a mixture of 65% 2,4- and 35% 2,6-tolylene diisocyanate as described in Example 1(a). An isocyanate mixture having an NCO content of about 40.1% is obtained.

b. About 100 parts of an addition product of about 90% propylene oxide and about 10% ethylene oxide with trimethylol propane, average molecular weight about 3000, about 3 parts water, about 1 part of a commercial polyether polysiloxane (L 540 produced by Union Carbide Corp.), about 0.5 parts of a tertiary amine and about 0.5 parts of a stannous octoate were vigorously mixed with about 48.0 parts of the product prepared in Example 4(a). A soft polyurethane foam having a unit weight of about 35 kg/m$^3$, a tensile strength of about 1.2 kg/wt/cm$^2$, elongation at break of about 260% and compression strength at 40% compression of about 35 p/cm$^2$ is obtained.

EXAMPLE 5 a. About 2445 parts of diethylamine are reacted with about 30,000 parts of a mixture of 80% 2,4- and 20% 2,6-tolylene diisocyanate as described in Example 1(a). An isocyanate mixture having an NCO content of about 35.5% is obtained.

b. About 102 parts of the product described in Example 5(a) are vigorously mixed with about 100 parts of a product obtained from a sorbitol polyether of OH number 480, about 0.8 parts of endoethylene piperazine, about 1 part of silicone stabilizer (Sf. 1109 produced by General Electric Co.) and about 40 parts of monofluoro trichloromethane. A hard polyurethane foam which has the following physical properties is obtained:

| | |
|---|---|
| Unit weight | 28 kg/m² |
| Compression strength | 2.1 kg/wt/cm² |
| Heat bending resistance | 110°C. |

The foam is dimensionally stable over the range of -30°C. to 100°C.

c. About 40 parts of an addition product of propylene oxide and trimethylol propane (OH number 650), about 60 parts of an addition product of about 87% propylene oxide and about 13 parts of ethylene oxide to propylene glycol (molecular weight about 4000) which has been grafted with about 4.8 parts of styrene and about 19.2 parts of acrylonitrile with the addition of azo diisobutyronitrile (viscosity at 25° C., about 4200 cP, OH number 12), about 1 part of silicone stabilizer (B k400 produced by Goldschmidt AG), about 2 parts of N-methyl-N'-(N,N-dimethylaminoethyl) piperazine and about 8 parts of monofluorotrichloromethane are mixed and the mixture is vigorously stirred for about 10 seconds with about 71 parts of a polyisocyanate which is prepared according to Example 5(a), (from about 3122 parts of diethylamine and about 30,000 parts of a mixture of 80% 2,4- and 20% 2,6-tolylene diisocyanate, viscosity at 25° C., about 10 cP, NCO about 32%). The mixture is introduced into a metal mold which is heated to about 60° C. (dimensions of molded part 300 mm. × 300 mm. × 10 mm.). The foaming reaction begins after about 30 seconds and the reaction product gels after about a further 20 seconds. After about 5 minutes, the molded product is removed from the mold. It has an overall apparent density of about 0.707 g/cm³ and a solid marginal zone on both sides.

The mechanical properties of the synthetic resin produced are as follows:

| | |
|---|---|
| Flexural strength according to DIN 53423 | $\delta_{bB}$ = 260 kg/wt/cm² |
| Elastic modulus from bending test | $E_b$ = 6800 kg/wt/cm² |
| Practical dimensional stability in the heat under bending stress according to DIN 53424, bending stress approximately a deflection of 10 mm | 3 kg/wt/cm² at $HB_{10}$ = 82°C. |

EXAMPLE 6 a. About 1766 parts of a crude tolylene diisocyanate having an NCO content of about 39% are reacted with about 73 parts of diethylamine as described in Examle 1(a). A polyisocyanate having an NCO content of about 33.7% and a viscosity of about 1047 cP at 25° C. is obtained.

b. About 104 parts of the polyisocyanate described in Example 6(a) are thoroughly mixed with about 100 parts of propylene oxide polyether of OH number 470 which has been started with sorbitol, about 1 part of endoethylene piperazine, about 1 part of silicone stabilizer (Sf 1109 produced by General Electric Co.) and about 40 parts of monofluorotrichloromethane. A hard polyurethane foam resin having the following physical properties is obtained:

| | |
|---|---|
| Unit weight | 25 kg/m³ |
| Compression strength | 2.5 kg/wt/cm² |
| Resistance to bending in the heat | 130°C. |

The foam resin is dimensionally stable over the temperature range of -30° to 100° C.

EXAMPLE 7 a. A mixture of about 101.3 parts of diethylamine and about 24.95 parts of water is added dropwise at about 80° C., about 1700 parts 2,4-tolylene diisocyanate. The resulting suspension is then heated to about 175° C. for about 1 hour, the precipitate going into solution. A polyisocyanate which has an NCO content of about 31.5% and a viscosity of about 1137 cP at 25° C. is obtained.

b. About 115 parts of the polyisocyanate prepared in Example 7(a) are vigorously mixed with about 100 parts of a propylene oxide polyether of OH number 470 which is started with sorbitol, about 0.8 parts of endoethylene piperazine, about 1 part of silicone stabilizer (Sf 1109 of General Electric Co.) and about 40 parts of monofluorotrichloromethane. A hard polyurethane foam having the following physical properties is obtained:

| | |
|---|---|
| Unit weight | 26 kg/m³ |
| Compression strength | 2.9 kg/wt/cm² |
| Resistance to bending in the heat | 142°C. |

The foam resin is dimensionally stable over the temperature range of -30° to 100° C.

c. About 40 parts of an addition product of propylene oxide and trimethylol propane (OH number 650), about 60 parts of the addition product of about 84% propylene oxide and about 13 parts of ethylene oxide to propylene glycol (molecular weight about 4000) which has grafted with about 4.8 parts of styrene and about 19.2 parts of acrylonitrile with the addition of azo diisobutyronitrile (viscosity at 25° C. about 4200 cP, OH number about 12), about 1 part of silicone stablizer (B 1400 produced by Goldschmidt AG), about 2 parts of N-methyl-N'-(N,N-dimethylaminoethyl)-piperazine and about 8 parts of monofluorotrichloromethane are mixed, and the mixture is vigorously stirred for about 10 seconds with about 74 parts of the polyisocyanate prepared according to Example 7(a), (viscosity at 25° C. about 1137 cP, NCO about 31.4%). The mixture is introduced into a metal mold (300 mm. × 300 mm. × 10 mm.) and heated to about 60° C. The reaction starts after about 30 seconds, the reaction mass foaming up. The reaction product gels after about a further 20 seconds. The molded product is removed from the mold after about 5 minutes. It has an overall apparent density of about 0.66 g/cm$^3$ and a dense marginal zone on both sides.

The mechanical properties of the synthetic resin produced are as follows:

| | |
|---|---|
| Flexural strength DIN 53423 | $\delta_{bB}$ = 265 kg/wt/cm$^2$ |
| Elastic modulus from bending test | $E_b$ = 6800 kg/wt/cm$^2$ |
| Practical dimensional stability in the heat under bending stress in accordance with DIN 53424, flexural stress approximately at 10 mm. deflection: | 3 kg/wt/cm$^2$ HB$_{10}$ = 102°C. | d. About 100 parts of a polypropylene glycol which is started with trimethylol propane and which is modified with ethylene oxide so as to contain about 60% primary hydroxyl groups in the end positions at an OH number of 35.0, about 2.5 parts of water, about 0.2 parts of endoethylene piperazine and about 2.0 parts of dimethylbenzylamine are mixed and reacted with about 38.9 parts of a mixture of 2,4- and 2,6-tolylene diisocyanate which is modified with water/diethylamine (2:1) as in Example 7(a) and which contains 80% 2,4- and 20% 2,6-tolylene diisocyanate (NCO content about 40.55%, viscosity at about 25° C. about 22 cP).

A foam resin having the following mechanical properties is obtained:

| | |
|---|---|
| Unit weight according to DIN 53420 | 50 kg/m$^3$ |
| Tensile strength according to DIN 53571 | 0.8 kg/wt/cm$^2$ |
| Elongation at break according to DIN 53571 | 130% |
| Pressure test at 40% compression according to DIN 53577 | 30 p/cm$^2$ | e. About 100 parts of a polypropylene glycol of hydroxyl number 35 which is started with trimethylol propane and which is modified with ethylene oxide so as to contain about 60% of primary hydroxyl groups in the end positions, about 36.5 parts of the polyisocyanate used in Example 7(d), about 2.5 parts of water and about 0.5 parts of an amine catalyst, tetramethyl guanidine, were thoroughly mixed. The resulting foam resin is self-extinguishing according to ASTM-D 1692.

EXAMPLE 8

About 169 parts of diethylamine are reacted with about 1823 parts of hexamethylene diisocyanate as described in Example 1(a). An isocyanate mixture having an NCO content of about 35.6% and a viscosity of about 12 cP at 25° C. is obtained.

EXAMPLE 9

About 255 parts of piperidine are reacted with about 2451 parts of hexamethylene diisocyanate as described in Example 1(a). An isocyanate mixture having an NCO content of about 34.35% is obtained.

EXAMPLE 10 a. About 73 parts of diethylamine are added dropwise to about 1470 parts of 4,4'-diphenylmethane-diisocyanate at about 80° C. The resulting suspension is then heated at about 170° C. for about 3 hours, the precipitate going into solution. After cooling and filtration, an isocyanate mixture having an NCO content of about 26.9% and a viscosity of about 126 cP at 25° C. is obtained. In contrast to 4,4'-diphenylmethane-diisocyanate, which crystallizes at room temperature, the reaction product remains liquid at room temperature.

b. About 100 parts of a polypropylene glycol which is started with trimethylpropane and is modified with ethylene oxide so as to contain about 65% primary hydroxyl groups in end positions at an OH number of 35.0, about 2.5 parts of water, about 0.2 parts of endoethylene piperazine, about 1.5 parts of triethylamine and about 1 part of a polyglycol ether of oleic acid amide are mixed and reacted with about 57.0 parts of the polyisocyanate prepared in Example 10(a).

A foam resin which has the following mechanical properties is obtained:

| | |
|---|---|
| Unit weight according to DIN 53420 | 47 kg/m$^3$ |
| Tensile strength according to DIN 53571 | 0.9 kg/wt/cm$^2$ |
| Elongation at break according to DIN 53571 | 150% |
| Pressure test at 40% compression according to DIN 53577 | 27 p/cm$^2$ |

EXAMPLE 11 a. About 111.5 parts of N,N'-diethyl-4,4'-diaminodiphenylmethane are reacted with about 1000 parts of 4,4'-diphenylmethane-diisocyanate as described in Example 10(a). A polyisocyanate having an NCO content of about 25.3% and a viscosity of about 800 cP at 25° C. is obtained.

b. About 50 parts of an addition product of propylene glycol to trimethylolpropane (OH number about 650), about 20 parts of an addition product of propylene oxide to triisopropanolamine (OH number about 290), about 30 parts of an addition product of ethylene oxide/propylene oxide to trimethylolpropane (OH number about 28), about 1 part of silicone stabilizer (B 1500 produced by Goldschmidt AG), about 2 parts of N-methyl-N'-(N,N-dimethylaminoethyl) piperazine and about 8 parts of monofluorotrichloromethane are mixed and the mixture is thoroughly stirred for about 10 seconds with about 147 parts of the polyisocyanate prepared in Example 11(a), (viscosity at 25° C., about 800 cP, NCO about 25.3%). The mixture is introduced into a metal mold (300 mm. × 300 mm. × 10 mm.) which is heated to about 60° C. The foaming reaction begins after about 40 seconds, and the reaction products gel after about a further 40 seconds.

The molded product is removed from the mold after about 5 minutes. It has an overall apparent density of about 0.640 g/cm$^3$ and a dense marginal zone on both sides.

The mechanical properties of the synthetic resin so produced are as follows:

| | |
|---|---|
| Flexural strength according to DIN 53423 | $\delta_{bB}$ = 335 kg/wt/cm$^2$ |
| Elastic modulus from bending test | $E_b$ = 8800 kg/wt/cm$^2$ |
| Practical dimensional stability in the heat under bending stress in accordance with DIN 53424, flexural stress approximately at 10 mm. deflection: | 3 kg/wt/cm$^2$ HB$_{10}$ = 111°C. |

EXAMPLE 12 a. About 75.3 parts of N,N'-dimethyl-4,4'-diaminodiphenylmethane are reacted with about 1440 parts of a crude 4,4'-diphenylmethanediisocyanate as described in Example 10(a). A polyisocyanate having an NCO content of about 26.75% and a viscosity of about 660 cP at 25° C. is obtained.

b. About 125 parts of the polyisocyanate described in Example 12(a) are thoroughly mixed with about 100 parts of a propylene oxide polyether of OH number 470 which is started with sorbitol, about 1 part of endoethylene piperazine, about 1 part of silicone stabilizer (Sf 1109 produced by General Electric Co.) and about 50 parts of monofluorotrichloromethane. A hard polyurethane foam resin having the following physical properties is obtained:

| | |
|---|---|
| Unit weight | 26 kg/m³ |
| Compression strength | 2.0 kg/wt/cm² |
| Resistance to bending in the heat | 115°C. |

EXAMPLE 13 a. About 131 parts of N,N'-diethyl-4,4'-diaminodiphenylmethane are reacted with about 1000 parts of a mixture of 80% 2,4- and 20% 2,6-tolylene diisocyanate as described in Example 1(a). A polyisocyanate having an NCO content of about 38.0% and a viscosity of about 29 cP at 25° C. is obtained.

b. About 100 parts of polypropylene glycol which is started with trimethylol propane/hexanetriol and is modified with ethylene oxide so as to contain about 65% primary hydroxyl groups in the end positions at an OH number of 35, about 2.5 parts of water, about 0.2 parts of endoethylene piperazine, about 1.5 parts of triethylamine and about 2.5 parts of a polypropylene glycol of OH number 380 which is started with trimethylol propane, are mixed together and reacted with about 41.5 parts of the polyisocyanate described in Example 13(a).

A foam resin having the following mechanical properties is obtained:

| | |
|---|---|
| Unit weight according to DIN 53420 | 45 kg/m³ |
| Tensile strength according to DIN 53571 | 0.7 kg/wt/cm² |
| Elongation at break according to DIN 53571 | 125% |
| Pressure test at 40% compression according to DIN 53577 | 31 p/cm² |

Although the invention is described in considerable detail in the foregoing examples it is to be understood that all materials given as suitable herein may be freely substituted for their counterparts in the examples and that one skilled in the art may make many variations therein without departing from the spirit and scope of the invention.

What is claimed is:

1. A process for the preparation of liquid polyisocyanates which contain biuret groups comprising reacting organic polyisocyanates of the general formula $$Q(NCO)_n$$

in which $n$ stands for an integer of 2–4 and Q stands for a hydrocarbon radical selected from the group consisting of $C_2$–$C_{12}$ aliphatic, $C_4$–$C_{15}$ cycloaliphatic, $C_6$–$C_{20}$ aromatic, $C_8$–$C_{20}$ alkylaromatic, $C_7$–$C_{20}$ araliphatic hydrocarbon radicals which araliphatic hydrocarbon radicals may also carry $C_1$–$C_4$ alkoxy substituents with secondary amines of the general formula.

$$R_1-NH-R_2$$

wherein $R_1$ and $R_2$ are the same or different and stand for radicals selected from the group consisting of $C_1$–$C_{18}$-alkyl, $C_6$–$C_{14}$-aryl and $C_7$–$C_{14}$-aralkyl or wherein $R_1$ and $R_2$ together with the nitrogen atom or part of a heterocyclic pyrrolidine, piperidine or morpholine ring, of of the general formula $$R_1-NH-R_3-NH-R_2$$

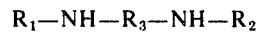

wherein $R_1$ and $R_2$ are the same or different and stand for radicals selected from the group consisting of $C_1$–$C_{18}$-alkyl, $C_6$–$C_{14}$-aryl and $C_7$–$C_{14}$-aralkyl and wherein $R_3$ stands for a radical selected from the group consisting of $C_2$–$C_{12}$ alkylene and $C_6$–$C_{20}$ arylene which arylene radical may contain bridge members such as oxygen, sulphur or an optionally $C_6$–$C_{10}$-aryl- or $C_1$–$C_4$-alkyl substituted methylene group, or wherein $R_1$ and $R_2$ together with $-NH-R_3-NH-$ may form a heterocyclic piperazine ring at a temperature of from about 80° to about 200° C., the reactants being present in amounts such that the ratio of NCO groups to NH groups is from about 4 to 1 to about 100 to 1.

2. The process of claim 1 wherein the organic polyisocyanate is a diisocyanate.

3. The process of claim 2 wherein the diisocyanate is selected from the group consisting of 2,4-tolylene diisocyanate, 2,6-tolylene diisocyanate and isomeric mixtures thereof, hexamethylene diisocyanate, 1-isocyanato-3,3,5-trimethyl-5-isocyanatomethyl-cyclohexane and 4,4'-diphenylmethane diisocyanate.

4. The process of claim 1 wherein the secondary amine is a secondary monoamine.

5. The process of claim 4 wherein the secondary monoamine is selected from the group consisting of N-methylaniline, diphenylamine, dibutylamine, diethylamine and piperidine.

6. The process of claim 1 wherein the secondary amine is a disecondary diamine.

7. The process of claim 6 wherein the disecondary diamine is N,N'-diethyl-4,4'-diaminodiphenylmethane.

8. The process of claim 1 wherein the secondary amine is a mixture of secondary monoamines and disecondary diamines.

* * * * *